(12) United States Patent
Kruse

(10) Patent No.: US 9,676,355 B2
(45) Date of Patent: Jun. 13, 2017

(54) FRONTAL AIRBAG SYSTEMS FOR OBLIQUE CRASH PROTECTION

(71) Applicant: Autoliv ASP, Inc., Ogden, UT (US)

(72) Inventor: Dion Kruse, Alingsas (SE)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 14/880,657

(22) Filed: Oct. 12, 2015

(65) Prior Publication Data

US 2017/0101071 A1    Apr. 13, 2017

(51) Int. Cl.
| | |
|---|---|
| *B60R 21/0136* | (2006.01) |
| *B60R 21/233* | (2006.01) |
| *B60R 21/2338* | (2011.01) |
| *B60R 21/2342* | (2011.01) |
| *B60R 21/00* | (2006.01) |
| *B60R 21/01* | (2006.01) |

(52) U.S. Cl.
CPC ........ *B60R 21/0136* (2013.01); *B60R 21/233* (2013.01); *B60R 21/2338* (2013.01); *B60R 21/2342* (2013.01); *B60R 2021/0004* (2013.01); *B60R 2021/0009* (2013.01); *B60R 2021/01013* (2013.01); *B60R 2021/01225* (2013.01); *B60R 2021/01238* (2013.01); *B60R 2021/23382* (2013.01)

(58) Field of Classification Search
CPC ............ B60R 21/0136; B60R 21/2338; B60R 21/233; B60R 21/2342; B60R 2021/0004; B60R 2021/01238; B60R 2021/01225; B60R 2021/01013; B60R 2021/0009; B60R 2021/23382

See application file for complete search history.

(56) References Cited

U.S. PATENT DOCUMENTS

| | | | |
|---|---|---|---|
| 3,618,979 | A | 11/1971 | Chute |
| 5,529,337 | A | 6/1996 | Takeda et al. |
| 6,254,121 | B1 | 7/2001 | Fowler et al. |
| 6,554,313 | B2 | 4/2003 | Uchida |
| 6,786,504 | B2 | 9/2004 | Lorenz et al. |
| 7,195,275 | B2 | 3/2007 | Abe |
| 8,876,153 | B2 | 11/2014 | Dix |
| 9,205,798 | B1 * | 12/2015 | Jindal ............... B60R 21/16 |
| 2006/0163848 | A1 * | 7/2006 | Abe ................. B60R 21/231 280/729 |

(Continued)

FOREIGN PATENT DOCUMENTS

| | | |
|---|---|---|
| DE | 10301715 A1 | 7/2004 |
| EP | 0657329 A1 | 6/1995 |

(Continued)

*Primary Examiner* — Darlene P Condra
(74) *Attorney, Agent, or Firm* — Stoel Rives LLP

(57) ABSTRACT

An inflatable airbag system can be configured to be mounted to a frontal region of a vehicle. The inflatable airbag system includes an airbag and an active control mechanism, and is configured to deploy in various configurations in response to frontal and oblique collision events. An active portion of the inflatable airbag deploys to an expanded configuration when a collision event is an oblique collision event and deploys to a less expanded configuration when the collision event is a frontal collision event. The active control mechanism can include one or more tethers or an inflatable member.

21 Claims, 10 Drawing Sheets

(56) References Cited

U.S. PATENT DOCUMENTS

| | | | |
|---|---|---|---|
| 2009/0224519 A1* | 9/2009 | Fukawatase | B60R 21/233 280/736 |
| 2014/0175778 A1* | 6/2014 | Choi | B60R 21/2338 280/743.2 |
| 2014/0375035 A1* | 12/2014 | Fukawatase | B60R 21/231 280/731 |
| 2015/0175116 A1* | 6/2015 | Cho | B60R 21/205 280/729 |
| 2015/0298643 A1* | 10/2015 | Schneider | B60R 21/233 280/729 |
| 2015/0307055 A1* | 10/2015 | Cheng | B60R 21/203 280/728.3 |
| 2015/0321636 A1* | 11/2015 | Jang | B60R 21/2338 280/743.2 |
| 2016/0046254 A1* | 2/2016 | Yamada | B60R 21/233 280/729 |
| 2016/0046257 A1* | 2/2016 | Yamada | B60R 21/2338 280/729 |
| 2017/0015266 A1 | 1/2017 | El-Jawahri et al. | |

FOREIGN PATENT DOCUMENTS

| | | | | |
|---|---|---|---|---|
| GB | 2192841 A | | 1/1988 | |
| SE | GB 2415665 A | * | 1/2006 | B60R 21/233 |
| WO | 9734783 A1 | | 9/1997 | |

\* cited by examiner

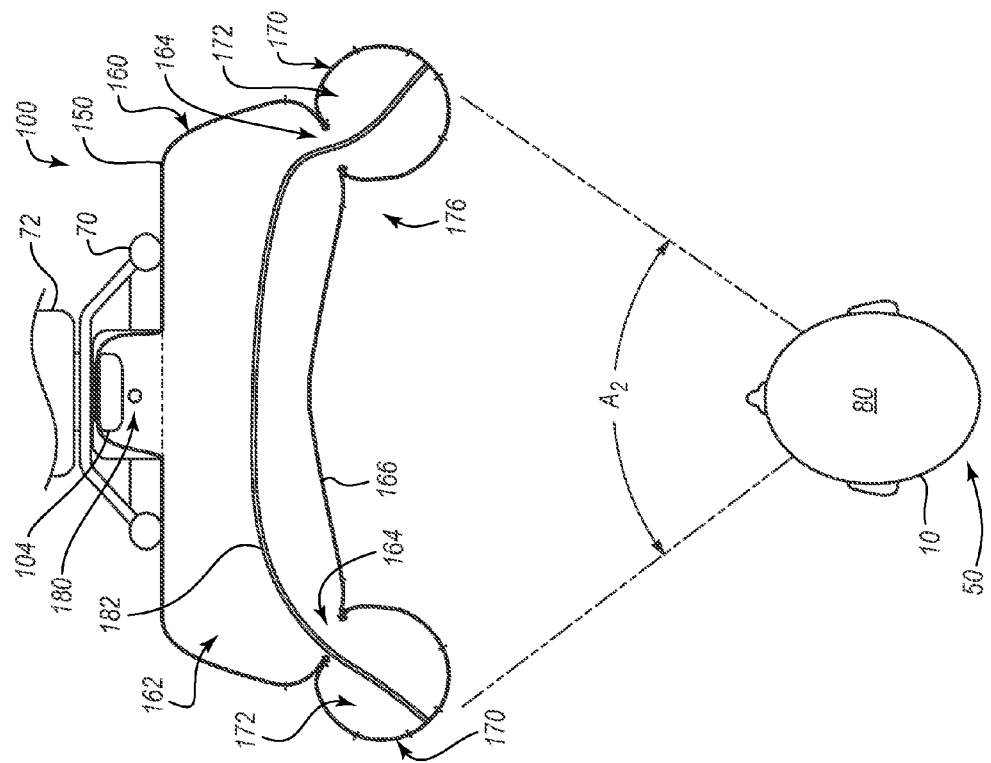
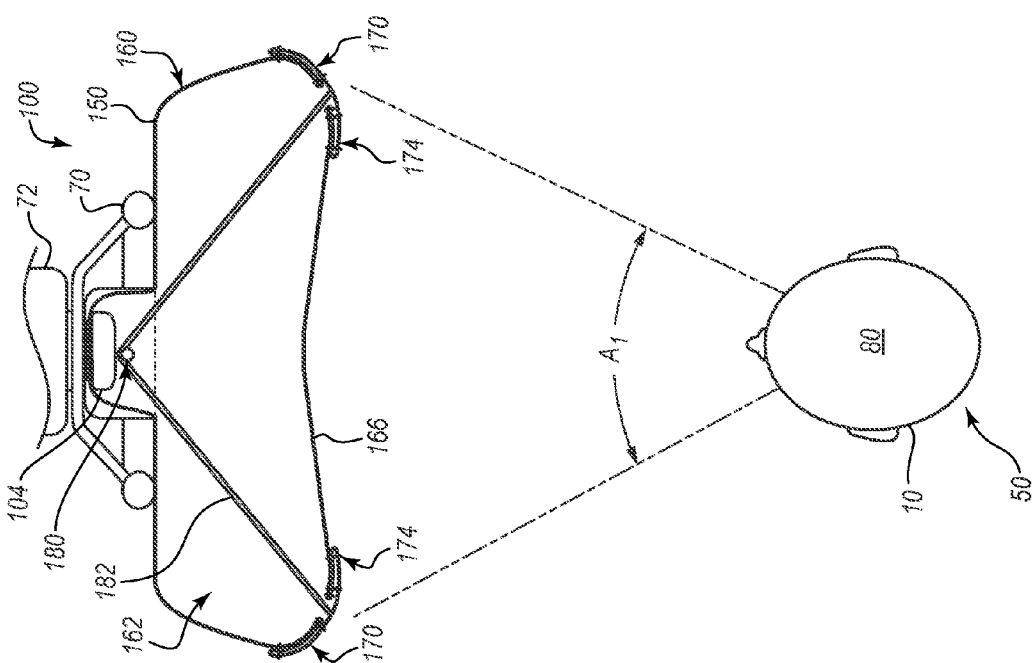

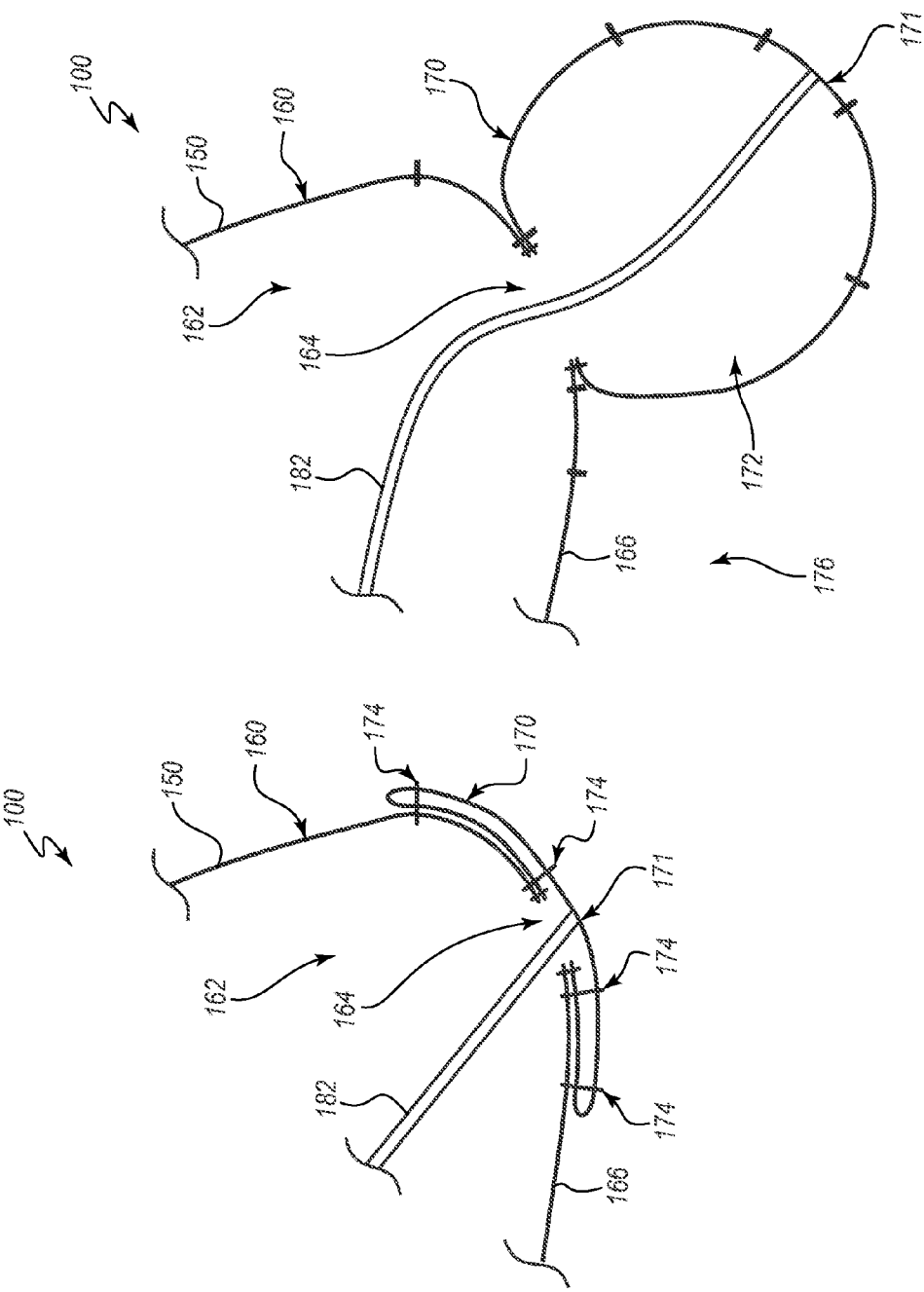

FRONTAL AIRBAG SYSTEMS FOR OBLIQUE CRASH PROTECTION

TECHNICAL FIELD

The present disclosure relates generally to the field of automotive protective systems. More specifically, the present disclosure relates to frontal airbag systems that are configured to deploy in response to frontal and oblique collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 3A is a top view of the inflatable airbag system of FIG. 1A, the airbag deployed in a first configuration in response to a frontal collision event.

FIG. 3B is another top view of the inflatable airbag system of FIG. 1A, the airbag deployed in a second configuration in response to an oblique collision event.

FIG. 5A is a close-up top view of the inflatable airbag system of FIG. 1A, the airbag deployed in a first configuration in response to a frontal collision event.

FIG. 5B is a close-up top view of the inflatable airbag system of FIG. 1A, the airbag deployed in a second configuration in response to an oblique collision event.

DETAILED DESCRIPTION

Figure 1A:
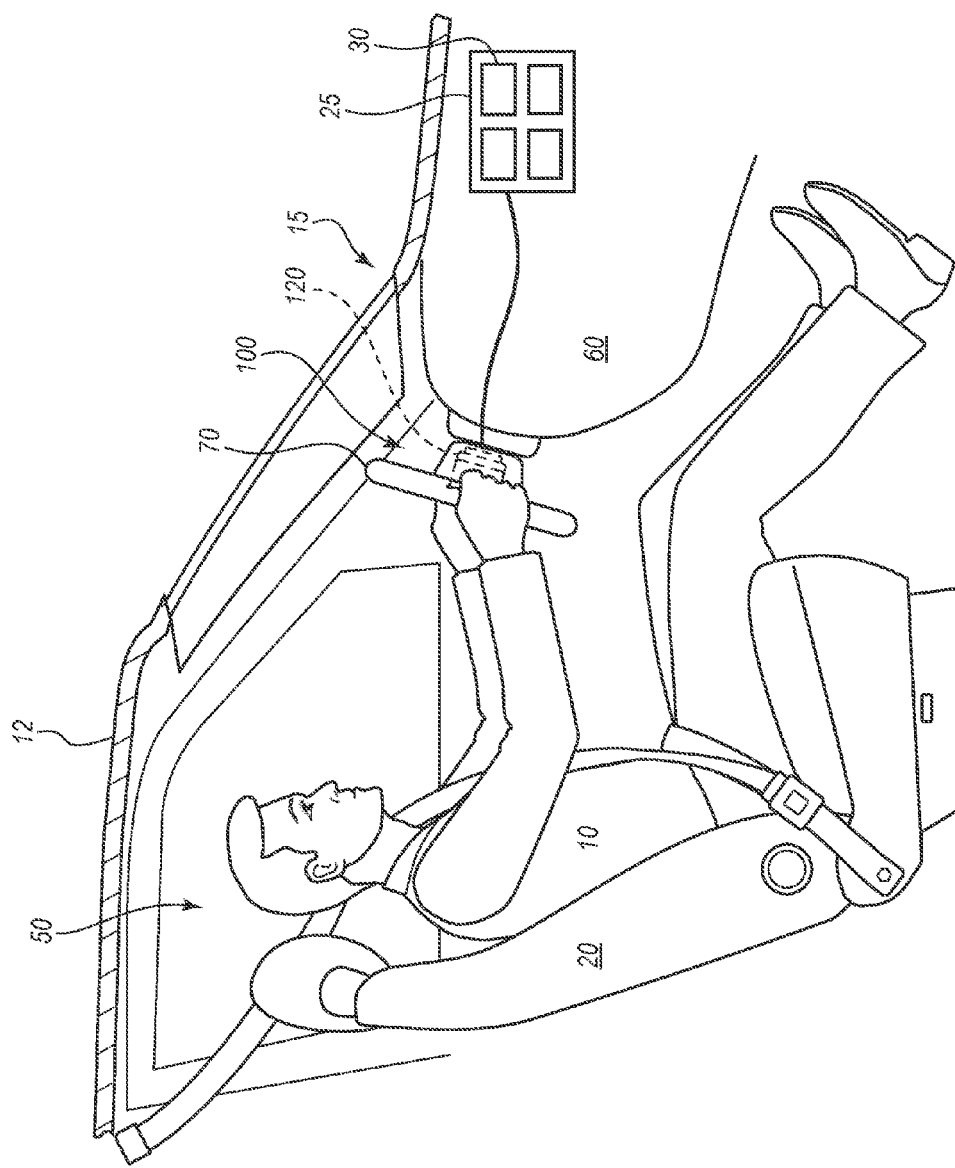
FIG. 1A is a side view of an interior side of a vehicle having an inflatable airbag system depicted in a compact configuration, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a driver airbag that is typically housed within a steering wheel, although the principles discussed may apply to other types of airbags (e.g., passenger airbags, instrument panel airbags, knee airbags, and side airbags).

Front airbags are often installed in a steering wheel, dashboard, or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as driver airbags, and may be mounted in a steering wheel. In some embodiments, an airbag assembly includes an airbag comprising multiple portions (e.g., cushions, chambers, regions, sections, pieces) that are configured to cushion an occupant during a collision event. A base cushion, or base cushion portion, can be configured to deploy primarily toward a seating position (e.g., a vehicle occupant position, the position typically occupied by a vehicle occupant, or a position in which a vehicle is designed to transport an occupant). This base cushion, or base cushion portion, may be configured to receive the torso and/or the head of a passenger in a collision event.

Additional or supplemental cushions or cushion portions may be in fluid communication with the base cushion of the airbag, and may be configured to deploy primarily in a similar direction as the base cushion. For example, one or more supplemental cushion portions may be configured to receive inflation gas from the base chamber during, or upon, deployment and/or inflation of the base cushion. Further, the supplemental cushion portions may be disposed on a surface, face, or panel of the base cushion that is positioned or otherwise configured to face toward the seating position.

In some embodiments, one or more cushion portions may be arranged and/or disposed concentric to one another. The supplemental cushion portions may be particularly suited for receiving and cushioning the head of a vehicle occupant during certain types of collision events. Moreover, the supplemental cushion portions may be configured to prevent the head of a vehicle occupant from sliding off the airbag when the occupant moves in an oblique direction relative to a direction of travel of the vehicle.

Airbags that have multiple cushion portions (e.g., multi-chamber airbags) may provide increased protection to a passenger, as compared with certain airbags that have only a single inflatable portion. For example, in some embodiments, the base cushion or base cushion portion may be configured to receive a vehicle occupant in a frontal collision event that causes the vehicle occupant to move primarily directly forward, as previously stated, and/or primarily in a direction of travel.

One or more supplemental cushion portions may be configured to receive a vehicle occupant during a collision event that causes the vehicle occupant to move in both a forward direction and an inboard direction (e.g., oblique to the forward direction or direction of travel of the vehicle). The supplemental cushion portions may be configured to prevent the head of the vehicle occupant from disengaging the airbag. Specifically, the supplemental cushion portions may limit the head of a vehicle occupant from sliding off the airbag in a direction that is oblique to the direction in which the airbag may be configured to deploy.

For example, in some instances an airbag may not provide effective coverage for a vehicle occupant who, during a collision event, travels in a forward and inboard trajectory (which may also be referred to as an angled or oblique trajectory). In some instances, a vehicle occupant may slide off of the airbag cushion during loading of the airbag when the occupant has a forward and inboard trajectory, or the occupant may entirely fail to engage with the cushion. An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is traveling in a direction that is not substantially parallel to the other vehicle's direction of travel; co-linear vehicle-to-vehicle collisions, such as collisions where, immediately prior to impact, both vehicles are traveling in substantially parallel directions; or collisions with a stationary object. These and other collisions can result in oblique movement of the occupant, which may allow the occupant's head to slide or fall off the cushion of an airbag.

As a vehicle occupant's head falls from the cushion of an airbag, a head twist can result that can cause severe angular velocity of the vehicle occupant's head. Reducing the angular velocity of the head can reduce a risk of head and/or brain injury. Additional concentric cushions and/or cushion portions can aid in reducing the angular velocity of the head. In addition to cushioning the head, supplemental concentric cushion portions can be configured in such a way to provide more cushion surface contact area around the occupant's head and may be configured to create a pocket or cavity to retain the head. The supplemental cushion portions may be configured to protrude above a contact surface of the base cushion, and/or the supplemental cushion portions may be configured to protrude from a front surface of the base cushion to form a primary contact surface of the airbag.

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

Figure 1B:
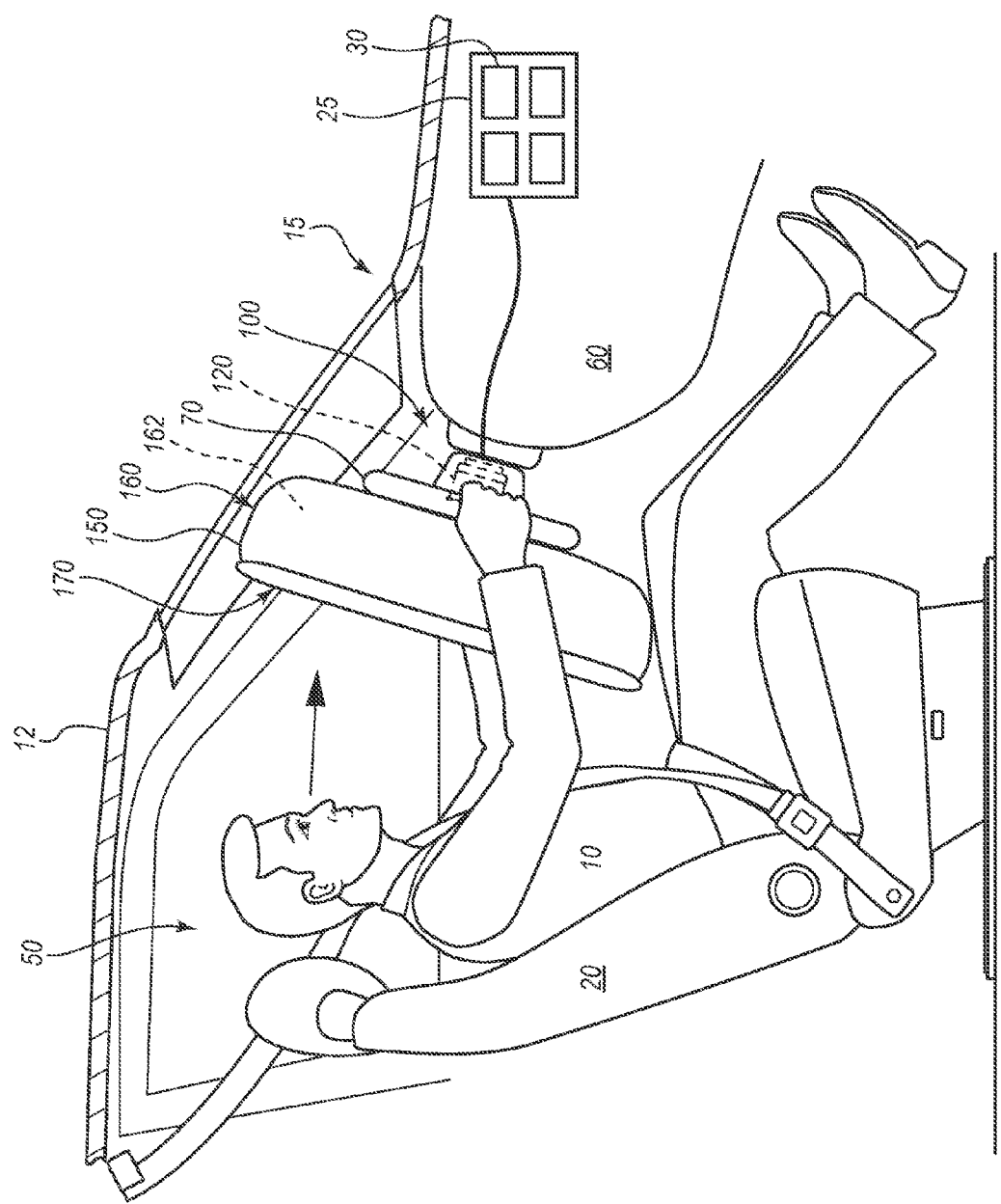
FIG. 1B is another side view of an interior side of a vehicle having the inflatable airbag system of FIG. 1A, the inflatable airbag system deployed in a first configuration.
Figure 1C:
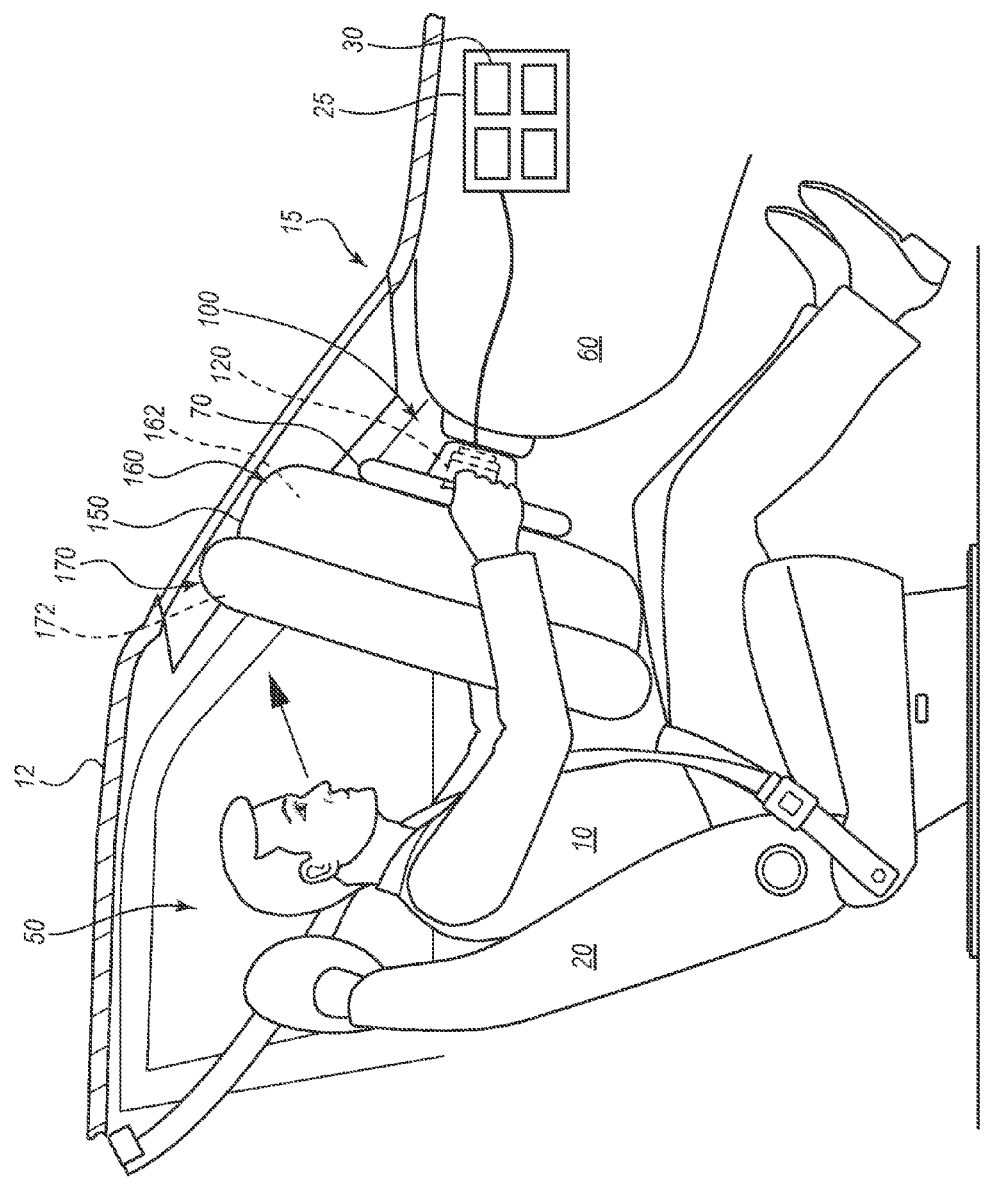
FIG. 1C is another side view of an interior side of a vehicle having the inflatable airbag system of FIG. 1A deployed in a second configuration.

FIGS. 1A-1C are side views of an interior of a vehicle 12, in which an occupant 10 is seated on and/or in a seat 20. The vehicle 12 includes an inflatable airbag assembly 100, according to one embodiment, mounted in a steering wheel 70 of the vehicle 12. FIG. 1A is a side view of the interior of the vehicle 12 with an inflatable airbag 150 in an undeployed or compact configuration prior to deployment. FIG. 1B is the airbag 150 of the inflatable airbag system 100 of FIG. 1A deployed in a first configuration. FIG. 1C is the airbag 150 deployed in a second configuration. As can be appreciated, the first and second configurations of the airbag 150 can also be referred to herein as the first and second states of a deployed configuration or the first and second deployed configurations.

Referring to FIGS. 1A-1C generally and collectively, the inflatable airbag system 100 can be configured to be mounted to a frontal region 15 of the vehicle 12. For example, in the illustrated embodiment of FIGS. 1A-1C, the inflatable airbag system 100 is mounted in a steering wheel 70 on the driver side of the vehicle 12. In other embodiments, the inflatable airbag system 100 can be mounted on the passenger's side of a vehicle 12, for example, in the instrument panel 60. The inflatable airbag system 100 mounted in the steering wheel 70 may be configured to expand and/or deploy during a collision event and protect the vehicle occupant 10 seated in a vehicle seating position 50 (e.g., a driver's seating position). The inflatable airbag system 100 may expand or deploy to provide cushioning restraint and protect the occupant 10 from harm caused by impacting a portion of the vehicle 12 during a collision event. In embodiments where the inflatable airbag system 100 is mounted in the instrument panel 60, the inflatable airbag system 100 may also be configured to expand and/or deploy from the instrument panel 60 during a collision event, and may prevent a vehicle occupant 10 seated in a passenger seat of the vehicle 12 from impacting a portion of the vehicle 12. The inflatable airbag system 100 includes an airbag (or inflatable airbag cushion) 150 configured to deploy from an airbag housing 120.

The airbag 150 may include a base cushion portion 160 and at least one active cushion portion 170 (or supplemental cushion portion), as shown in FIGS. 1B and 1C. The base cushion portion 160 may define an inflatable base chamber 162 configured to receive inflation gas from an inflator (not shown) in response to a collision event (e.g., a frontal or oblique collision event). During a collision event the inflatable base chamber 162 may receive sufficient inflation gas to cause the base cushion portion 160 to deploy and transition from a compact state to an expanded state.

The active cushion portion 170 may be coupled with the base cushion portion 160 and may be disposed on a surface of the base cushion portion 160 facing the vehicle seating position 50. The active cushion portion 170 may define an inflatable active chamber 172, and may be coupled with an active control mechanism (not shown) of the airbag assembly 100. The active control mechanism may place the airbag 150 in the first configuration by causing the active cushion portion 170 to remain in a compact (e.g., un-deployed) state during a collision event, as illustrated in FIG. 1B. Further, the active control mechanism may place the airbag 150 in the second configuration by causing, or otherwise configuring, the active cushion portion 170 to deploy (e.g., at least partially expand) during an oblique collision event, as illustrated in FIG. 1C.

Additionally, the inflatable airbag system 100 may be coupled with a control unit 25. The control unit 25 may include one or more impact detection sensors 30 configured to detect, for example, an angle of impact or an impact ratio of a collision event, or gather data for determining an angle of impact or impact ratio of a collision event. Further, impact detection sensors 30 may be configured to determine if a collision event is an oblique or frontal collision event based on a detected angle of impact or impact ratio. The impact detection sensors 30 may communicate the angle of impact, the impact ratio, or the determined type of a collision event to the control unit 25. Some embodiments may include various types of impact detection sensors 30, including, but not limited to, deceleration sensors, mechanical inertia sensors, and accelerometers. The control unit 25 may communicate the impact ratio, the angle of impact, or the type of a collision event (e.g., frontal or oblique) to the airbag system 100.

In some embodiments, a plurality of impact detection sensors (e.g., accelerometers) 30 can be used to detect the forces caused by the collision event. For example, a first sensor of the impact detection sensors 30 can sense or detect the amount of longitudinal impact applied to the vehicle 12 and a second sensor of the impact detection sensors 30 can sense or detect the amount of lateral impact applied to the vehicle 12. In such embodiments, the first sensor can send a signal to the control unit 25 and/or the active control mechanism when a threshold amount of longitudinal impact is detected, and the second sensor can send a signal to the control unit 25 and/or the active control mechanism when a threshold amount of lateral impact is detected. In some embodiments, the impact from a frontal collision event can trigger a signal from the first sensor and not the second sensor, causing the airbag 150 to deploy in the first configuration (e.g., the active cushion portion 170 not expanded), illustrated in FIG. 1B. The impact from an oblique collision event can trigger signals from both the first and second sensors, causing the airbag 150 to deploy in the second configuration (e.g., the active cushion portion 170 expanded), illustrated in FIG. 1C. In this manner, the impact detection sensor(s) 30 may detect an oblique collision event, and may report the detected oblique collision event to the airbag controller 25, or the active control mechanism (not shown).

The active control mechanism may receive input (e.g., an impact ratio, an angle of impact, or a type designation) indicating a type of the collision event and may cause the active cushion portion 170 to deploy and/or expand by configuring or otherwise causing the inflatable active chamber 172 defined by the active cushion portion 170 to fill with inflation gas. More specifically, placing the airbag 150 in the second configuration may allow the inflatable active chamber 172 to at least partially fill with inflation gas.

The airbag 150 may deploy according to various modes or configurations of the airbag 150, and based on a type, an impact ratio, or an angle of impact of a collision event. For example, as shown in FIG. 1B, the airbag 150 is configured to deploy in a first configuration (e.g., the base cushion portion 160 expanded and/or deployed, and the active cushion portion 170 not deployed) in response to a frontal, or substantially frontal, collision event. As shown in FIG. 1C, the airbag 150 is further configured to deploy in a second configuration (e.g., the base cushion portion 160 and the active cushion portion 170 both expanded or deployed) in response to an oblique or substantially oblique collision event.

An angled collision event or oblique collision event can cause the vehicle occupant 10 to move in both a forward and inboard direction, such as toward a steering wheel 70 and inboard or toward a center of the vehicle 12 from, for example, the vehicle seating position 50 of the vehicle 12. Certain embodiments of the airbag 150 described herein may be configured to prevent and/or minimize harm to a vehicle occupant 10 during an oblique collision event.

During an oblique collision event, the airbag 150 and the base and active cushion portions 160, 170 of the airbag 150 may deploy by substantially filling with inflation gas. The vehicle occupant 10 may impact the airbag 150, and the airbag 150 may prevent the head of the vehicle occupant 10 from sliding off of the airbag 150. More specifically, the active cushion portion 170 may be configured to receive the vehicle occupant 10, and may be shaped to limit and/or restrict inboard motion of the vehicle occupant 10.

Figure 2:
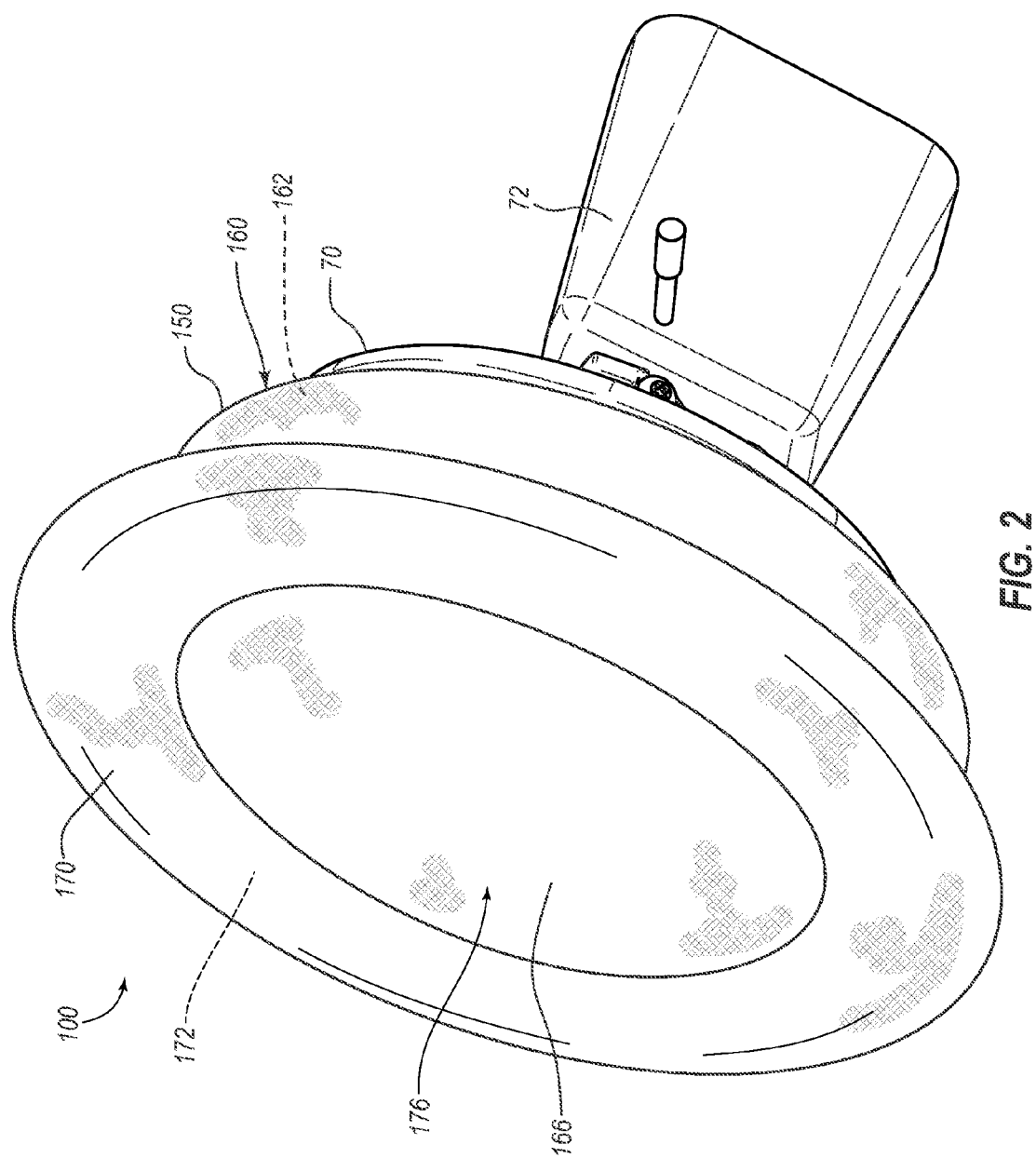
FIG. 2 is a perspective view of the airbag of FIG. 1A, the airbag deployed in a second configuration.

FIG. 2 is a perspective view of the airbag system 100 deployed in a second configuration, as in FIG. 1C. The airbag 150 is shown deployed from the steering wheel 70 in a rearward direction (e.g., away from a steering wheel column 72). The airbag 150, as noted, includes a base cushion portion 160 and an active cushion portion 170. The base cushion portion 160 may be configured to facilitate inflation and operation of the inflatable airbag system 100. Further, the base cushion portion 160 may be coupled with and/or configured to deploy in abutment with the steering wheel 70 of the vehicle 12, and may define an inflatable base chamber 162. The base cushion 160 may include a plurality of cushion vent apertures (not shown) that may communicate inflation gas to an inflatable active chamber 172 defined by the active cushion portion 170. The plurality of cushion vent apertures may operate based on the configuration of the airbag 150 and/or the active control mechanism as will be described more fully.

In the embodiment of FIG. 2, the active cushion portion 170 is coupled with the base cushion portion 160, and specifically to an occupant-facing surface 166 of the base cushion portion 160. The active cushion portion 170 may be a ring or toroidal shape. The active cushion portion 170 and a main panel or rear surface 166 of the base cushion 160 may collectively define a space 176 or cavity at or within an interior of the ring or toroidally shaped active cushion portion 170, to receive the vehicle occupant 10 during a collision event. More specifically, the space 176 may be formed by the inner sidewall of the ring shaped active cushion portion 170 and the rear or main panel and/or surface 166 of the base cushion portion 160.

FIGS. 3A and 3B are top views of the inflatable airbag system 100 of FIG. 1A, the airbag 150 deployed from the steering wheel 70 in the first and second configurations, respectively. The airbag 150 is deployed in response to a collision event, and has received inflation gas from an inflator 104 to expand toward the vehicle occupant 10 and away from the steering wheel column 72. FIG. 3A is the airbag 150 deployed in a first configuration to provide crash protection for the occupant 10 during a frontal collision. FIG. 3B is the airbag 150 deployed in a second configuration to provide crash protection for the occupant 10 during an oblique collision event.

Referring generally and collectively to FIGS. 3A and 3B, the airbag 150 may include a plurality of cushion vent apertures 164 between the base cushion portion 160 and the active cushion portion 170. The plurality of cushion vent apertures 164 may enable fluid communication between the base cushion portion 160 and the active cushion portion 170. More specifically, the plurality of cushion vent apertures 164 may place the inflatable active chamber 172 defined by the active cushion portion 170 in fluid communication with the inflatable base chamber 162 defined by the base cushion 160.

During deployment of the airbag 150 in the second configuration, shown in FIG. 3B, the inflatable base chamber 162 may communicate inflation gas to the inflatable active chamber 172 via the plurality of cushion vent apertures 164. A sufficient volume of inflation gas may be communicated to the inflatable active chamber 172, to cause the active cushion portion 170 to transition from a compact state to an expanded state. Stated differently, the plurality of cushion vent apertures 164 may provide fluid communication from the inflatable base chamber 162 to and/or between the inflatable active chamber 172, when the active control mechanism 180 has enabled the active cushion portion 170 to deploy by placing the airbag 150 in the second configuration.

Certain embodiments of the airbag 150 may include one or more valves (not shown) to control the flow of inflation gas of the inflatable airbag system 100. In some embodiments, one or more valves may be disposed in a main panel of the base cushion 160. In other embodiments, one or more of the cushion portions coupled with the base cushion 160 may define one or more valves of the airbag 150. In certain embodiments, the valves may be one directional. In certain embodiments, the valves may be opened with a tether and/or a pyrotechnic to control airbag configuration.

With continued reference to FIGS. 3A and 3B generally and collectively, before or during deployment of the airbag 150, an electronic signal may be sent from a control unit associated with the airbag 150, from one or more impact angle detection sensors. The electronic signal may be sent from the control unit to the airbag 150 or the active control mechanism 180 to electronically signal the type of collision event that has occurred (e.g., an oblique collision event or a frontal collision event). For example, if the impact detection sensors signal a frontal collision event, the airbag 150 will deploy in the first configuration, which is shown in FIG. 3A. If the impact detection sensors signal an oblique collision event, the airbag 150 will deploy in the second configuration, which is shown in FIG. 3B.

The active control mechanism 180 of the illustrated inflatable airbag system 100 is configured to at least partially control the expansion and/or deployment of the airbag 150 (e.g., the active cushion portion 170). The active control mechanism 180 may include or be coupled to at least one tether 182 with one or more tether adjustment mechanisms.

The at least one tether 182 may be coupled to the active control mechanism 180 at one end, and attached or coupled with an inner surface or sidewall of the active cushion portion 170 at the other end of the tether 182. The expansion of the active cushion portion 170 may be restricted, adjusted, enabled, or otherwise impacted by the at least one tether 182 of the active control mechanism 180. By altering one or more properties of the tether 182 (e.g., the length, connection, location, position, angle, and/or orientation), the active control mechanism 180 may control the expansion or deployment of the inflatable air bag system 100 to achieve a first or second configuration of the airbag 150.

Adjustment of the active control mechanism 180 may include the location, position, orientation, or functionality of the active control mechanism 180. For example, in one embodiment the active control mechanism 180 may include a motor to retract or extend the one or more tethers 182. Alternatively, the motor may, in other embodiments, be used to alter the location of the active control mechanism 180 (e.g., move backward, toward the occupant 10, or forward and away from the occupant 10) instead of retracting or extending one or more tethers 182. In another embodiment, the active control mechanism 180 may include a tether cutter. The active control mechanism 180 may cut the tether 182 to allow the active cushion portion 170 to expand and/or deploy. In still another embodiment, the active control mechanism 180 may include a controllable clamp, fastener, or hook which may be coupled to the tether 182 in the first airbag configuration, and may be decoupled from the tether 182 in the second airbag configuration.

Decoupling the one or more tethers 182 and the active control mechanism 180, as shown in FIG. 3B, allows the airbag 150 to transition to the second configuration, and may allow a plurality of tear seams 174 coupling the active cushion portion 170 to the base cushion portion 160, to burst and/or release. More specifically, the airbag 150 in FIG. 3B is deployed in the second configuration, the tether 182 decoupled from the active control mechanism 180. The active cushion portion 170 is enabled to receive inflation gas from the apertures 164 to expand or deploy. With the airbag 150 deployed in the second configuration, a greater portion of the airbag 150, or a greater portion of inflation gas within the airbag 150, is positioned more inboard and in front of, or in line with, an oblique post-collision trajectory or direction of travel of the occupant 10 or occupant's head 80 than when the airbag 150 is deployed in the first configuration.

An angle from a normal seating position 50 (e.g., the vehicle seating position 50 of FIGS. 1A-1C) to a lateral edge (e.g., inboard edge, outboard edge) of the airbag 150 may be referred to as a function angle. The airbag 150 in FIG. 3A is deployed in a first configuration and defines a first function angle, $A_1$, formed from the normal seating position 50 to outboard and inboard peripheries of the base cushion portion 160. Similarly, the airbag 150 in FIG. 3B is deployed in the second configuration and defines a second function angle, $A_2$, formed from the normal seating position 50 to outboard and inboard peripheries of the active cushion portion 170. The first and second function angles $A_1$ and $A_2$ of the airbag 150, deployed in the first and second configurations, respectively, each define a functional range of the airbag 150, or a range over which the airbag 150 provides crash protection to the vehicle occupant 10. Stated differently, If the occupant's direction of travel relative to the airbag 150 is within the function angle defined by the configuration of the airbag 150, the occupant 10 will substantially impact or be protected by the airbag 150. In contrast, if the occupant's direction of travel is outside of the function angle defined by the configuration of the airbag 150, the occupant 10 will miss or not impact the airbag 150. The effectiveness of the airbag 150 in receiving and/or restraining the occupant 10 or occupant's head 80 during a collision event decreases as the occupant's direction of travel approaches the extremes or edges of the function angle $A_1$, $A_2$ defined by the airbag 150. As shown, the second configuration of the airbag 150 increases or widens the function angle $A_2$ to provide increased inboard oblique crash protection.

Figure 4B:
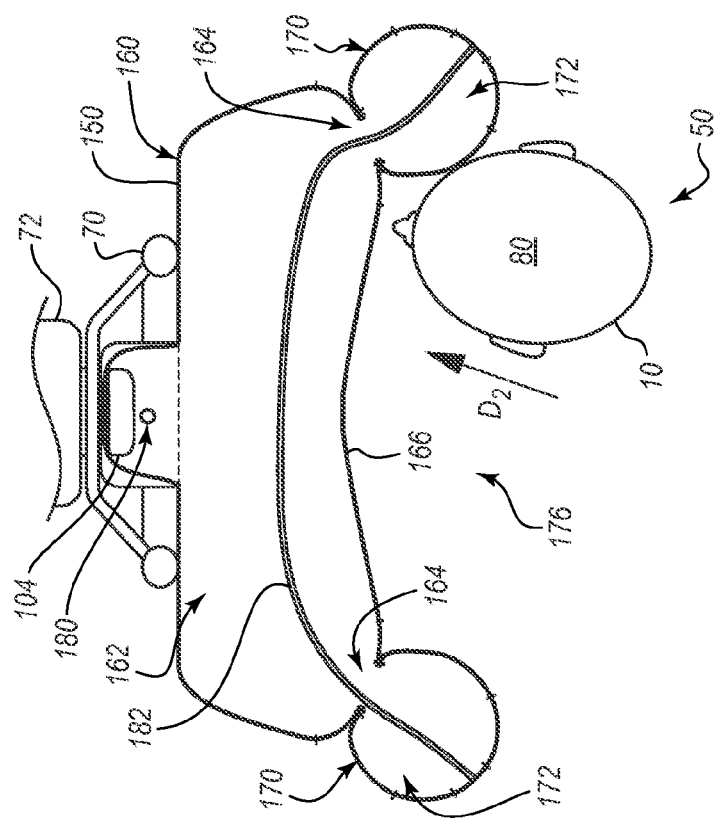
FIG. 4B is another top view of the inflatable airbag system of FIG. 1A, the airbag deployed in a second configuration in response to an oblique collision event.
Figure 4A:
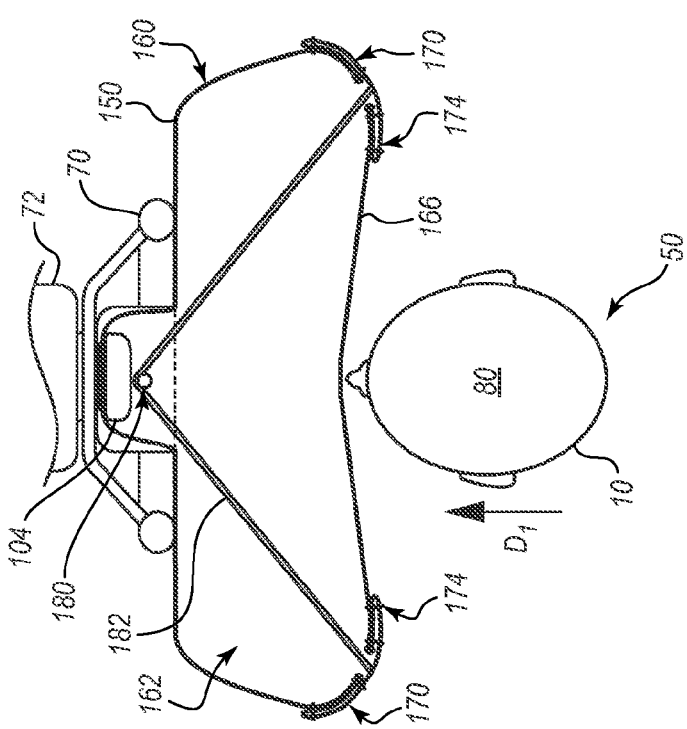
FIG. 4A is another top view of the inflatable airbag system of FIG. 1A, the airbag deployed in a first configuration in response to a frontal collision event.

FIGS. 4A and 4B are additional top views of the inflatable airbag system 100 of FIG. 1A, depicting the airbag 150 coupled with a steering wheel 70 and deployed in the first and second configurations, respectively. The airbag 150 is deployed in response to a collision event, and has received inflation gas from the inflator 104 to expand toward the vehicle occupant 10 and away from the steering wheel column 72. FIG. 4A is the inflatable airbag system 100 of FIG. 1A with the airbag 150 deployed in the first configuration. FIG. 4B is the inflatable airbag system 100 of FIG. 1A with the airbag 150 deployed in the second configuration.

FIGS. 4A and 4B provide illustrations of varying directions of occupant travel, based on the type of collision event or the angle of impact of the collision event. FIGS. 4A and 4B also illustrate how the airbag 150 may protect the occupant 10 moving in different directions of travel based on different collision events. For example, the occupant 10 may travel in a first direction $D_1$ from the normal seating position 50 in the event of a frontal collision, shown in FIG. 4A, or in a second direction $D_2$ in the event of an inboard oblique collision event, shown in FIG. 4B.

FIG. 4A is a top view of the inflatable airbag system 100 of FIG. 1A with the airbag 150 deployed in the first configuration in response to a purely frontal collision event. The occupant's expected direction of travel from the normal seating position 50 may be in a purely forward direction $D_1$. Accordingly, the active control mechanism 180 adjusts or maintains the airbag 150 in the first configuration to cause the active cushion portion 170 to remain unexpanded. More particularly, the active control mechanism 180 may maintain the one or more tethers 182 coupled to the active cushion portion 170, to cause the airbag cushion 150 to deploy in the first configuration, and to prevent or substantially restrict expansion of the active cushion portion 170.

In FIG. 4A, the tether 182 is coupled to the active control mechanism 180, and, together with the plurality of tear seams 174, is preventing expansion of the active cushion portion 170. Accordingly, the airbag 150 is disposed in the first configuration, and provides a uniform or substantially planar rear surface 166 of the base cushion portion 160.

In FIG. 4B the tether 182 is uncoupled from the active control mechanism 180, allowing expansion of the active cushion portion 170 and bursting the tear seams 174. Accordingly, the airbag 150 is disposed in the second configuration, allowing the inflatable active chamber 172 to receive inflation gas, and shaping the airbag 150 or the rear surface 166 to include a uniform and/or substantially planar region surrounded by the toroidal or ring shaped active cushion portion 170. The active cushion portion 170 disposed on the rear surface 166 of the base cushion portion 160 defines a space 176 or cavity to receive the occupant's head 80.

The airbag 150 of FIG. 4B is deployed in the second configuration in response to an oblique or substantially oblique collision event with the occupant's head 80 traveling in a second or inboard oblique direction $D_2$, from the vehicle seating position 50. The inboard oblique direction $D_2$ is both forward (e.g., toward the rear surface 166 of the airbag 150, or toward the steering wheel 70) and inboard (e.g., toward a center of the vehicle 12), and is thus oblique to the purely forward direction of travel $D_1$. The occupant 10 may travel in the second direction $D_2$ from the normal seating position 50 as a result of forces on the vehicle 12 during the oblique collision event.

When the occupant's head 80 travels in a purely forward direction, such as the direction $D_1$ of FIG. 4A, the airbag 150 need not be configured with a large function angle to effectively provide crash protection to the occupant 10. However, when the occupant 10 or occupant's head 80 travels in an oblique direction $D_2$ as shown in FIG. 4B, a function angle of insufficient size can result in reduced protection of the occupant 10. In some cases, a typical function angle (e.g., the first function angle $A_1$ shown in FIG. 3A) may not be sufficiently wide to allow adequate crash protection for an occupant 10 moving in an oblique direction. Stated differently, a minimum function angle of the airbag 150 may be required during oblique collision events to prevent the vehicle occupant 10 from rolling off of or moving away from the deployed airbag 150. Increasing the function angle of the airbag 150, specifically during an oblique collision event, can increase the protection for the occupant 10 travelling in the oblique direction $D_2$. Stated otherwise, if the function angle of the airbag 150 can be increased during an inboard oblique collision, occupant protection increases. And if the function angle can be increased during an outboard collision, occupant protection increases. As described previously, the second airbag configuration, in which the active cushion portion 170 is expanded and/or deployed toward or nearer the seating position 50 and/or more outward laterally relative to the seating position 50 widens the function angle of the airbag 150, increasing occupant protection.

FIGS. 5A and 5B are enlarged top views of the inflatable airbag system 100 of FIG. 1A. FIG. 5A is the airbag 150 deployed in a first configuration in response to a frontal collision event. FIG. 5B is the airbag 150 deployed in a second configuration, the inflatable active chamber 172 inflated, in response to an oblique collision event.

As described, a tether 182 may be coupled to the active cushion portion 170, more specifically, to an inner surface of a sidewall 171 of the active cushion portion 170. The tether 182 may be coupled to the active control mechanism while the airbag 150 is in the first configuration preventing and/or substantially restricting any expansion of the active cushion portion 170. Further, the airbag 150 includes a plurality of tear seams 174 coupling the sidewall 171 to the base cushion portion 160. The plurality of tear seams 174 and the tether 182 may be configured to collectively prevent the inflatable active chamber 172 from inflating while the tether 182 couples the active cushion portion 170 with the active control mechanism (shown in FIGS. 3A and 3B). Stated differently, the plurality of tear seams 174 and the one or more tethers 182 may function to prevent the inflatable active chamber 172 from substantially receiving inflation gas while the airbag 150 is deployed in the first configuration, as shown in FIG. 5A.

When the airbag 150 is deployed in the second configuration, such as in FIG. 5B, the one or more tethers 182 will no longer substantially prevent or restrict expansion of the active cushion portion 170 toward the occupant. Further, with the airbag 150 deployed in the second configuration the plurality of tear seams 174 may break or release in response to the pressure upon the sidewall 171 from the inflation gas of the inflatable base chamber 162, decoupling the sidewall 171 of the active cushion portion 170 from the base cushion portion 160. Decoupling the sidewall 171 and the base cushion portion 160 may allow the inflatable active chamber 172 to receive inflation gas from the plurality of cushion vent apertures 164, causing the active cushion portion 170 to expand and substantially fill with inflation gas and deploy further rearward.

Figure 6:
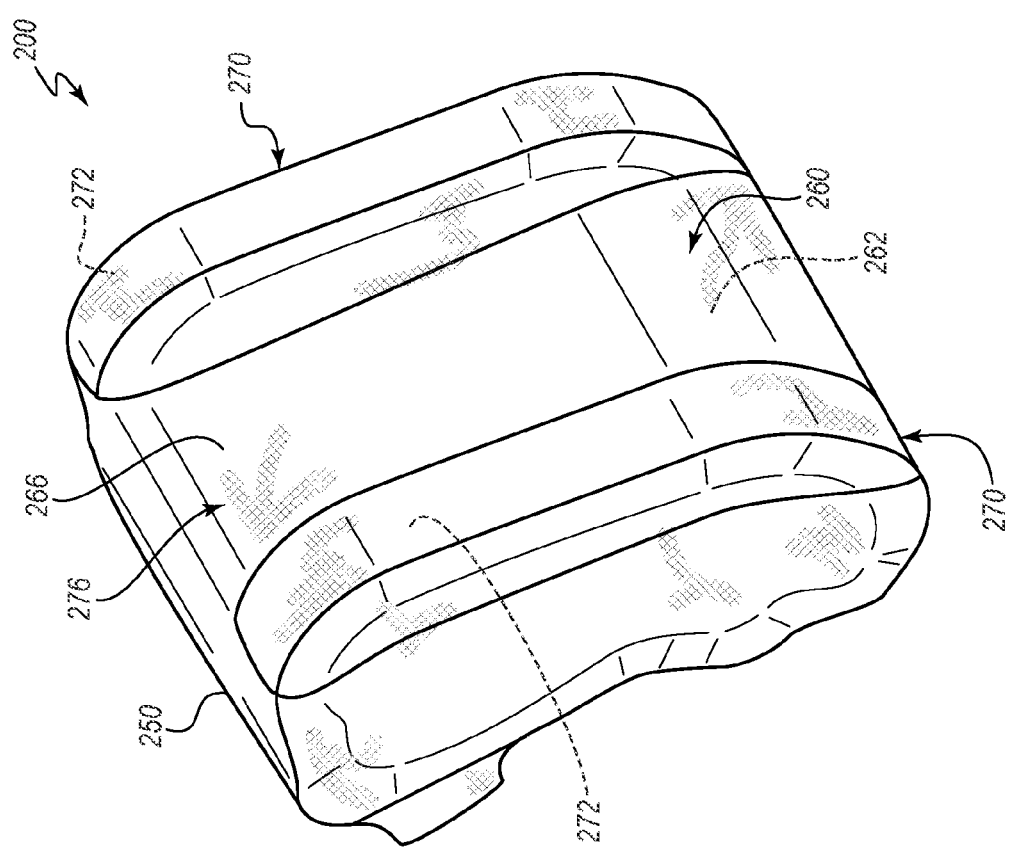
FIG. 6 is a perspective view of an inflatable airbag system, according to another embodiment of the present disclosure, with an airbag deployed in a second configuration.

FIG. 6 is a perspective view of an inflatable airbag system 200, according to another embodiment of the present disclosure. The inflatable airbag system 200 may resemble the inflatable airbag system 100 described above in certain respects. Accordingly, like features are designated with like reference numerals, with the leading digits incremented to "2." Relevant disclosure set forth above regarding similarly identified features thus may not be repeated hereafter. Moreover, specific features of the inflatable airbag system 200 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the inflatable airbag system 200. Any suitable combination of the features and variations of the same described with respect to the inflatable airbag system 100 can be employed with the inflatable airbag system 200, and vice versa.

The inflatable airbag system 200 of FIG. 6 includes an inflatable airbag 250. In FIG. 6, the inflatable airbag 250 is deployed in a second configuration. The inflatable airbag 250 includes a base cushion portion 260 and an active cushion portion 270. The base cushion portion 260 may be configured to facilitate inflation and operation of the inflatable airbag system 200. The base cushion portion 260 may be coupled with an instrument panel (see instrument panel 60 of FIGS. 7A and 7B) of a vehicle, and may define an inflatable base chamber 262.

In FIG. 6, the active cushion portion 270 is coupled with the base cushion portion 260. More specifically, the active cushion portion 270 is disposed on an occupant-facing surface of the base cushion portion 260. The active cushion portion 270 may include a plurality of cushion portions disposed along or at an outer edge, an outer periphery, or a portion thereof of a rear (or occupant-facing) surface of the base cushion portion 260. In the embodiment of FIG. 6, the active cushion portion 270 includes two cushion portions disposed on the lateral sides (e.g., an inboard side and an outboard side) of the airbag 250, which two cushion portions are collectively referred to herein as the active cushion portion 270. The active cushion portion 270 may define one or more inflatable active chambers 272 which may be in fluid communication with the inflatable base chamber 262 defined by the base cushion portion 260. Further, the active cushion portion 270 and a rear or main panel 266 of the base cushion portion 260 may collectively define a space 276 between the two individual cushion portions of the active cushion portion 270 and the main panel 266 to receive a vehicle occupant during a collision event.

During deployment of the airbag 250, one or more impact detection sensors may detect an oblique collision event, and may communicate that an oblique collision event is detected to an active control mechanism that may be disposed within the airbag 250. The active control mechanism and may be configured to cause the airbag cushion 250 to deploy in a first configuration if the collision event is a frontal collision event and to cause the airbag cushion 250 to deploy in a second configuration if the collision event is an oblique collision event. More specifically, the active control mechanism may cause the active cushion portion 270 to deploy in a second configuration by adjusting (e.g., cutting, lengthening, shortening, decoupling) one or more tethers coupled with the active cushion portion 270 or, more specifically, to a sidewall 271 of the active cushion portion 270. Further, the active control mechanism may cause the active cushion portion 270 to deploy in a first configuration by avoiding or omitting such operation (e.g., adjusting one or more tethers coupled to the active cushion portion 270).

In another embodiment of the inflatable airbag system 200, the one or more impact detection sensors may detect an oblique collision event, and may report the oblique collision event to an airbag controller or control unit (not shown). The control unit may be configured to cause the active control mechanism to activate based on the oblique collision event reported to the control unit from the one or more impact detection sensors.

Figure 7A:
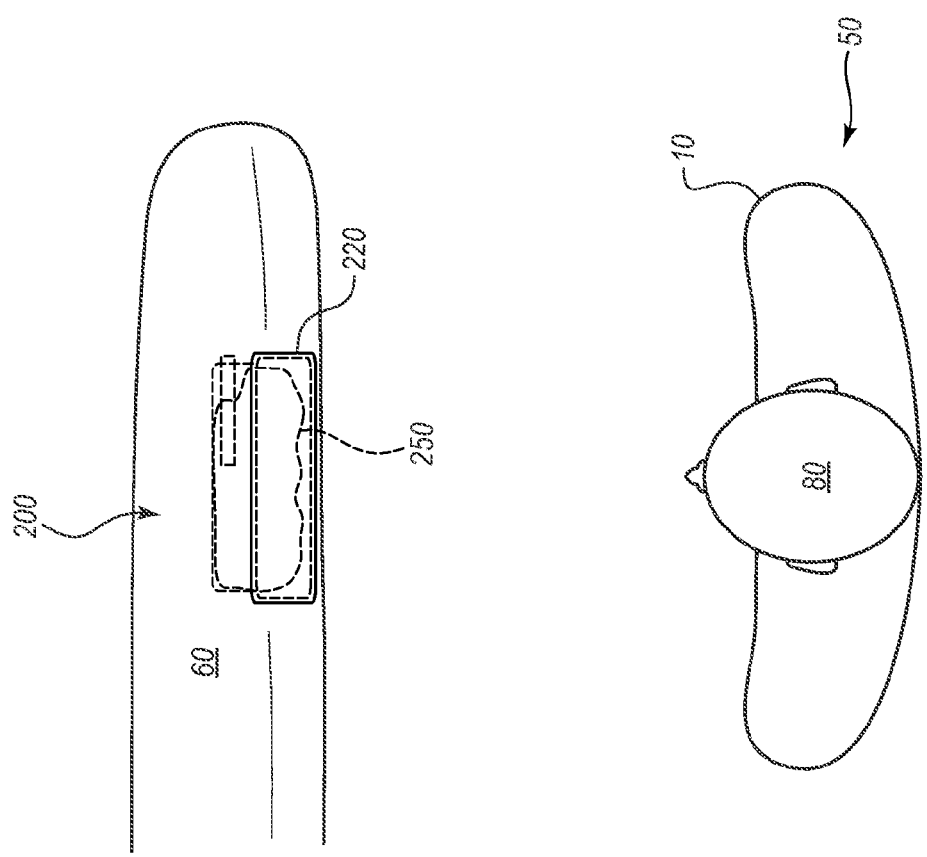
FIG. 7A is a top view of the inflatable airbag system of FIG. 6, the airbag deployed in a first configuration in response to a frontal collision event.
Figure 7B:
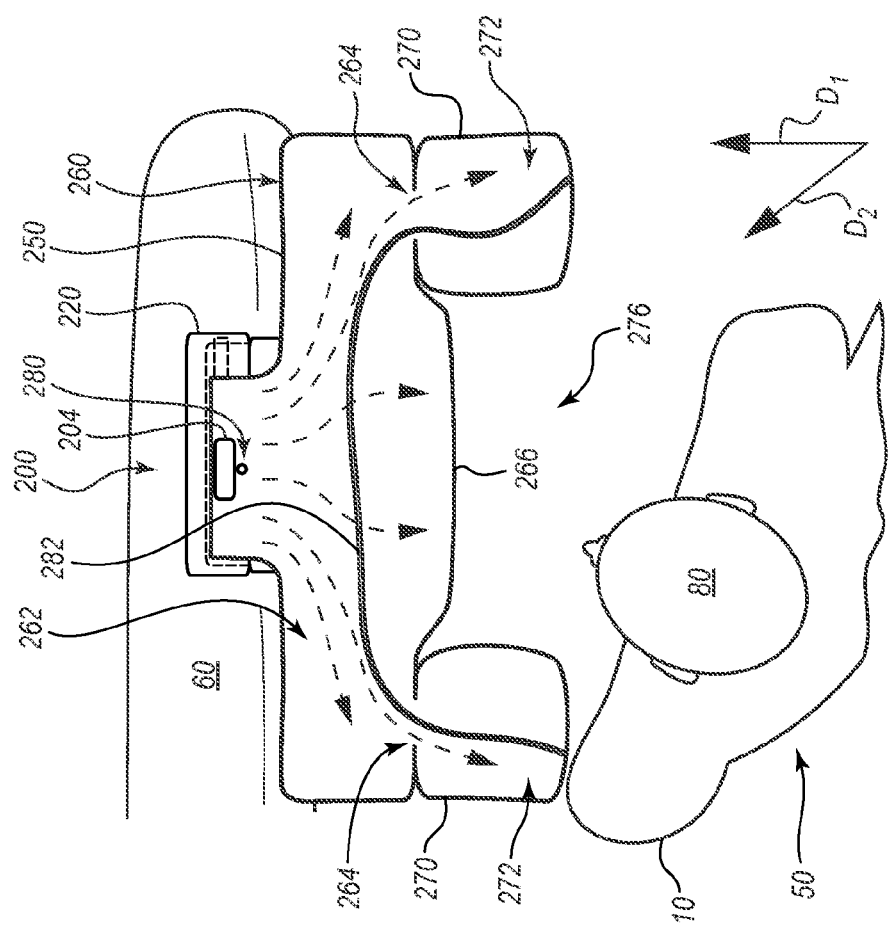
FIG. 7B is another top view of the inflatable airbag system of FIG. 6, the airbag deployed in a second configuration in response to an oblique collision event.

FIGS. 7A and 7B are top views of an interior of a vehicle, in which an occupant 10 is seated on and/or in a passenger seat of the vehicle. The vehicle includes an inflatable airbag assembly 200, according to one embodiment, mounted in an instrument panel 60 of the vehicle. FIG. 7A is a top view of the inflatable airbag system 200 of FIG. 6, prior to deployment. In FIG. 7A, the airbag 250 is disposed in an instrument panel 60 in a compact state. FIG. 7B is a top view of the inflatable airbag system 200 of FIG. 6 with the airbag 250 deployed in a second configuration. FIGS. 7A and 7B illustrate how a vehicle occupant or passenger 10 may travel in varying directions $D_1$, $D_2$ during frontal and oblique collision events, and how the airbag 250 may deploy, receive, and protect the occupant 10 or occupant's head 80 from harm during frontal and oblique collision events. More specifically, the airbag 250 may protect the vehicle occupant 10 when the occupant 10 travels in a first or substantially forward direction $D_1$ from a passenger seating position (e.g., during a frontal collision event), or when the occupant 10 travels in a second or inboard direction $D_2$ toward a center of the vehicle (e.g., during an oblique collision event).

Referring to FIGS. 7A and 7B generally and collectively, during a collision event, the airbag 250 can deploy and/or expand in a rearward direction, away from the instrument panel 60 and toward the vehicle occupant 10 or vehicle seating position 50. The airbag 250 may protect the vehicle occupant 10, seated in the vehicle seating position 50 (e.g., a passenger's seating position) from harm caused by impacting one or more portions of the vehicle during the collision event. The airbag (or inflatable airbag cushion) 250 may be configured to deploy from an airbag housing 220 that houses the airbag 250 while in a compact state prior to deployment.

As mentioned previously, the airbag 250 includes a base cushion portion 260 and at least one active cushion portion 270. The base cushion portion 260 defines an inflatable base chamber 262 that is configured to receive inflation gas from an inflator 204 in response to a collision event (e.g., frontal or oblique collision event). The inflatable base chamber 262 may receive sufficient inflation gas from an inflator 204 to cause the base cushion portion 260 to deploy and transition from a compact state to an expanded state.

The active cushion portion 270 may be disposed on a surface of and coupled with the base cushion portion 260, and may be configured to deploy toward the vehicle seating position 50 (e.g., a passenger seating position) when the airbag 250 is deployed in the second configuration. The active cushion portion 270 may be coupled with an active control mechanism 280 of the airbag assembly 200. The active control mechanism 280 may operate during a frontal collision event to place the airbag 250 in the first configuration by causing the active cushion portion 270 to remain in a compact (e.g., un-deployed) state, and may place the airbag 250 in the second configuration during an angled or oblique collision event by causing, or otherwise configuring, the active cushion portion 270 to deploy as illustrated in FIG. 7B.

When the airbag 250 is deployed in the second configuration, as shown in FIG. 7B, a plurality of cushion vent apertures 264 may enable fluid communication between the inflatable base chamber 262 and the inflatable active chamber 272. Stated differently, the plurality of cushion vent apertures 264 may provide fluid communication from the base chamber 262 to and/or between the inflatable active chamber 272, when the active control mechanism has enabled the active cushion portion 270 to deploy in the second configuration, or otherwise transitioned the airbag 250 to the second configuration. In contrast, when the airbag 250 is in the first configuration, expansion of the active cushion portion 270 may be restricted, thereby preventing the inflatable active cushion portion 272 from receiving inflation gas.

During an oblique collision event, the base cushion portion 260 and the active cushion portion 270 of the airbag 250 may deploy by at least partially filling with inflation gas. The vehicle occupant 10 may impact the airbag 250, and the airbag 250 may prevent the head 80 of the vehicle occupant 10 from sliding off of the airbag 250, or from impacting a portion of the vehicle. More specifically, the active cushion portion 270 may be configured to receive the vehicle occupant 10, and may be shaped and positioned to prevent and/or restrict continued inboard motion of the vehicle occupant 10 past the airbag 250 or due to sliding off the airbag 250.

In the embodiment of the inflatable airbag system 200, one or more impact detection sensors may detect an oblique collision event (or forces indicating such), and may report the detected oblique collision event to the airbag controller or control unit (not shown). The control unit may be configured to cause the active control mechanism 280 to activate and/or operate to place the airbag 250 in the second configuration. For example, during deployment of the airbag 250 in the second configuration, the inflatable base chamber 262 may communicate inflation gas to the inflatable active chamber 272 via the plurality of cushion vent apertures 264 of the base cushion 260. With the airbag 250 in the second configuration, a sufficient volume of inflation gas can be communicated to the inflatable active chamber 272 from the inflatable base chamber 262 to cause the active cushion portion 270 to transition from a compact state to an expanded state.

In a purely frontal collision event the airbag 250 may deploy in the first configuration, preventing expansion or deployment of the active cushion portion 270. The expected direction of travel of the occupant 10 from the normal vehicle seating position 50 may be in a purely or at least mostly forward direction $D_1$. Accordingly, the active control mechanism 280 adjusts or maintains the airbag 250 in the first configuration to prevent the active cushion portion 270 of the airbag 250 from deploying. More particularly, the active control mechanism 280 adjusts or maintains the one or more tethers 282 to cause the airbag cushion 250 to deploy in the first configuration. The one or more tethers 282 are maintained at a generally similar or uniform length or shape, to produce a first configuration of the airbag 250 that provides a uniform rear surface 266 to receive the occupant 10 or occupant's head 80. When the airbag 250 deploys in the first configuration (e.g., the active cushion portion 270 not expanded), the rear surface 266 or main panel of the airbag 250 may be uniform and/or substantially planar relative to the occupant 10. When the airbag 250 deploys in the second configuration (e.g., with the active cushion portion 270 expanded), the rear surface 266 or main panel may include a uniform and/or substantially planar region that is at least partially surrounded or bordered by the expanded and/or deployed active cushion portion 270.

As described previously, the second configuration of the airbag 250, in which the active cushion portion 270 is expanded and/or deployed toward or nearer the passenger seating position 50 and/or more outward laterally relative to the passenger seating position 50, may widen a function angle of the airbag 250. The function angle of the airbag 250 may be understood as an operational range of the airbag 250, as described for the airbag 150 in relation to FIGS. 3A and 3B. More specifically, when the direction of travel of the vehicle occupant 10 is within the function angle of the airbag 250, the airbag 250 will receive and/or protect the vehicle occupant's head 80 from continuing in an oblique trajectory and sliding off or past the airbag 250 and impacting a portion of the vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. An inflatable airbag system that is configured to be mounted to a steering wheel of a vehicle, the inflatable airbag system comprising:
   an airbag cushion comprising a base cushion portion and an active cushion portion, the base cushion portion and the active cushion portion forming separate chambers in fluid communication, the base cushion portion to receive inflation gas to deploy in an expanded state to provide cushioning restraint to an occupant during a collision event, the active cushion portion disposed on a surface of the base cushion portion that faces an occupant seating position of the vehicle;
   an active control mechanism to cause the airbag cushion to deploy in a first configuration if the collision event is a frontal collision event and to cause the airbag cushion to deploy in a second configuration if the collision event is an oblique collision event,
   wherein the active cushion portion is in an expanded state in the second configuration; and
   a tear seam disposed in a panel of the airbag cushion at the active cushion portion of the airbag, the tear seam configured to burst in response to the active control mechanism deploying the airbag cushion in the second configuration to allow the active cushion portion of the airbag to conform to the second configuration.

2. The inflatable airbag system of claim 1, wherein the active control mechanism is configured to receive input indicating a type of the collision event and to operate, based on the type of the collision event, to cause the active cushion portion of the airbag cushion to deploy in the first configuration if the input indicates the type of the collision event is a frontal collision event and to cause the active cushion portion of the airbag cushion to deploy in the second configuration if the input indicates the type of the collision event is an oblique collision event.

3. The inflatable airbag system of claim 2, wherein the active control mechanism activates to cause the airbag cushion to deploy in a second configuration and the active portion to assume the expanded state, if the input indicates the type of the collision event is an oblique collision event.

4. The inflatable airbag system of claim 2, further comprising:
   one or more impact angle detection sensors to detect an angle of impact of the collision event;
   a control unit to receive sensor data from the one or more impact angle detection sensors and to provide input to the active control mechanism as to the angle of impact of the collision event.

5. The inflatable airbag system of claim 2, further comprising:
   one or more impact angle detection sensors to detect an angle of impact of the collision event and provide the angle of impact to the active control mechanism.

6. The inflatable airbag system of claim 1, further comprising one or more impact angle detection sensors to detect an angle of impact of the collision event and provide the angle of impact to the active control mechanism.

7. The inflatable airbag system of claim 1, wherein the active control mechanism comprises at least one tether.

8. The inflatable airbag system of claim 7, wherein at least one tether is in an uncoupled state when the airbag cushion is in the second configuration and a coupled state when the airbag cushion is in the first configuration.

9. The inflatable airbag system of claim 7, wherein the active control mechanism is configured to, when activated, adjust a length of at least one tether.

10. The inflatable airbag system of claim 7, wherein the active control mechanism comprises a tether cutter that, when activated, cuts at least one tether to allow the active cushion portion of the airbag to expand.

11. The inflatable airbag system of claim 10, wherein the tear seam is configured to burst in response to cutting of the at least one tether to allow the active cushion portion of the airbag to conform to the second configuration.

12. The inflatable airbag system of claim 1, wherein the active cushion portion comprises a plurality of cushion portions disposed at an outer edge of the surface of the base cushion portion that faces the occupant seating position of the vehicle.

13. The inflatable airbag system of claim 1, wherein, in the second configuration, the active cushion portion prevents the head of the vehicle occupant from disengaging from the airbag.

14. An inflatable airbag system that is configured to be mounted at a frontal region of a vehicle, the inflatable airbag system comprising:
   an airbag cushion comprising a base cushion portion and an active cushion portion disposed on an occupant-facing surface of the base cushion portion, the airbag configured to receive inflation gas from the inflator to expand and deploy from the housing to provide occupant crash protection during a collision event;
   an active control mechanism to receive input indicating a type of collision event and to cause the active cushion portion of the airbag cushion to deploy in a first configuration if the type of collision event is a frontal collision event and to cause the active cushion portion of the airbag cushion to deploy in a second configuration if the type of collision event is an oblique collision event,
   wherein the active cushion portion of the airbag cushion is expanded in the second configuration and less expanded in the first configuration; and
   a tear seam disposed in a panel of the airbag cushion at the active cushion portion of the airbag, the tear seam configured to burst in response to the active control mechanism deploying the airbag cushion in the second configuration to allow the active cushion portion of the airbag to conform to the second configuration.

15. The inflatable airbag system of claim 14, further comprising:
   one or more impact angle detection sensors to detect an angle of impact of a collision event of the vehicle; and
   a control unit to receive the sensor data from the one or more impact angle detection sensors and relay an indication of the type of collision event as input to the active control mechanism.

16. The inflatable airbag system of claim 15, wherein the control unit determines an angle of impact of the collision event based on the sensor data from the one or more impact angle detection sensors and relays the angle of impact to the active control mechanism.

17. The inflatable airbag system of claim 16, wherein the active control mechanism is configured to receive the angle of impact and operate, based on the angle of impact, to cause the airbag cushion to deploy in the first configuration or the second configuration.

18. The inflatable airbag system of claim 14, further comprising one or more impact detection sensors to detect an angle of impact of the collision event and provide the angle of impact to the active control mechanism.

19. The inflatable airbag system of claim 14, wherein the active control mechanism comprises one or more of a tether cutter, a motor, and a pyrotechnic.

20. The inflatable airbag system of claim 14, wherein the active control mechanism comprises one or more tethers coupled to internal surfaces of the airbag cushion,
  wherein one or more tethers are adjusted to cause the airbag cushion to deploy in the second configuration, and
  wherein adjusting the one or more tethers changes a state of the active cushion portion when the inflatable chamber fills with inflation gas to expand the active cushion to an expanded state.

21. The inflatable airbag system of claim 14, wherein the active cushion portion comprises a plurality of cushion portions disposed at an outer edge of the occupant-facing surface of the base cushion portion.

\* \* \* \* \*